(12) United States Patent
Oh

(10) Patent No.: US 10,315,657 B2
(45) Date of Patent: Jun. 11, 2019

(54) VEHICLE CONTROL DEVICE

(71) Applicant: LG ELECTRONICS INC., Seoul (KR)

(72) Inventor: Hyungseok Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 15/593,542

(22) Filed: May 12, 2017

(65) Prior Publication Data

US 2017/0327120 A1    Nov. 16, 2017

(30) Foreign Application Priority Data

May 12, 2016  (KR) .................. 10-2016-0058232

(51) Int. Cl.
*B60W 30/182*     (2012.01)
*B60W 10/06*      (2006.01)
(Continued)

(52) U.S. Cl.
CPC .......... *B60W 30/182* (2013.01); *B60W 10/06* (2013.01); *B60W 10/20* (2013.01); *B60W 30/09* (2013.01); *B60W 30/18154* (2013.01); *B60W 30/18163* (2013.01); *B60W 40/13* (2013.01); *B60W 50/12* (2013.01); *B60W 50/14* (2013.01);
(Continued)

(58) Field of Classification Search
CPC ...... B60W 10/06; B60W 10/20; B60W 30/09; B60W 30/18154; B60W 30/18163; B60W 40/13; B60W 50/12; B60W 50/14; B60W 2540/10; B60W 2540/103; B60W 2550/10; B60W 2550/14; B60W 2550/30; B60W 2550/302; B60W 2550/306; B60W 2550/308

See application file for complete search history.

(56) References Cited

U.S. PATENT DOCUMENTS 7,141,001 B1    11/2006  Albanesi
2013/0158767 A1  6/2013  Araki

FOREIGN PATENT DOCUMENTS

CN  103079922  5/2013
CN  104044591  9/2014
(Continued)

OTHER PUBLICATIONS

JP2015-068271A, English machine translation, all pages. (Year: 2015).*

(Continued)

*Primary Examiner* — Calvin Cheung
(74) *Attorney, Agent, or Firm* — Fish & Richardson P.C.

(57) ABSTRACT

A vehicle control device includes a sensor configured to sense driving information of a vehicle, and a controller. The controller is configured to activate or deactivate a fuel conservation mode of the vehicle based on a user input, and restrict acceleration of an engine of the vehicle to be within a predetermined range based on an accelerator pedal of the vehicle being pressed with a force that is greater than a threshold force and based on the vehicle being in an activated state of the fuel conservation mode. The controller is also configured to, based on the driving information satisfying a first condition, release a restriction on the acceleration of the engine of the vehicle in the activated state of the fuel-conservation mode.

19 Claims, 15 Drawing Sheets

(51) Int. Cl.
  *B60W 10/20* (2006.01)
  *B60W 30/09* (2012.01)
  *B60W 30/18* (2012.01)
  *B60W 40/13* (2012.01)
  *B60W 50/12* (2012.01)
  *B60W 50/14* (2012.01)

(52) U.S. Cl.
  CPC ... *B60W 2540/10* (2013.01); *B60W 2540/103* (2013.01); *B60W 2550/10* (2013.01); *B60W 2550/14* (2013.01); *B60W 2550/30* (2013.01); *B60W 2550/302* (2013.01); *B60W 2550/306* (2013.01); *B60W 2550/308* (2013.01)

(56) References Cited

FOREIGN PATENT DOCUMENTS

| | | |
|---|---|---|
| CN | 104797478 | 7/2015 |
| EP | 2865634 | 4/2015 |
| JP | 2008068751 | 3/2008 |
| JP | 2009197673 | 9/2009 |
| JP | 2009234442 | 10/2009 |
| JP | 2010182187 | 8/2010 |
| JP | 2011253379 | 12/2011 |
| JP | 2012116356 | 6/2012 |
| JP | 2014090524 | 5/2014 |
| JP | 2015067394 | 4/2015 |
| JP | 2015068271 | 4/2015 |
| KR | 10-2010-0061199 | 6/2010 |

OTHER PUBLICATIONS

Extended European Search Report in European Application No. 17169220.5, dated Sep. 19, 2017, 9 pages (with English translation).
European Search Report in European Application No. 17169220.5, dated Sep. 19, 2018, 6 pages.

* cited by examiner

VEHICLE CONTROL DEVICE

CROSS-REFERENCE TO RELATED APPLICATION

Pursuant to 35 U.S.C. § 119(a), this application claims the benefit of earlier filing date and right of priority to Korean Application No. 10-2016-0058232, filed on May 12, 2016, the contents of which are incorporated by reference herein in its entirety.

TECHNICAL FIELD

The present disclosure relates to a vehicle control device.

BACKGROUND

A vehicle is a mechanism designed to transport people or loads. A common example of a vehicle is an automobile. Vehicles are typically provided with sensors and devices that provide functions to enhance safety and convenience of a driver and passengers. Functions of a vehicle are often categorized into convenience functions that enhance a driver's convenience, safety functions that enhance safety of a driver inside the vehicle and/or pedestrians outside the vehicle, and environment-friendly functions that protect the environment.

Convenience functions include infotainment functions in a vehicle, autonomous driving functions, or functions that assist a driver's visual perception via night vision or a blind spot view. Specific examples of convenience functions include an active cruise control (ACC), a smart parking assist system (SPAS), a night vision (NV), a head up display (HUD), an around view monitor (AVM), an adaptive headlight system (AHS), etc.

Safety functions are typically designed to enhance safety of a driver and/or pedestrians, and examples include a lane departure warning system (LDWS), a lane keeping assist system (LKAS), an autonomous emergency braking (AEB), etc.

Environment-friendly functions include as examples functions that enhance fuel efficiency of a car, functions that reduce emission of carbon dioxide, etc.

In an era of high oil prices, fuel efficiency is often regarded as an important performance index for a vehicle. Fuel efficiency is typically measured as a ratio of a distance traveled per unit of fuel consumed, for example measured in a unit of 'km/liter' indicating a distance a vehicle can travel with one liter of fuel.

SUMMARY

Implementations described herein provide a vehicle control device that selectively controls a vehicle to operate in a fuel conservation mode based on information that is sensed related to the vehicle.

In one aspect, a vehicle control device may include a sensor configured to sense driving information of a vehicle, and a controller. The controller may be configured to activate or deactivate a fuel conservation mode of the vehicle based on a user input, and restrict acceleration of an engine of the vehicle to be within a predetermined range based on an accelerator pedal of the vehicle being pressed with a force that is greater than a threshold force and based on the vehicle being in an activated state of the fuel conservation mode. The controller may also be configured to, based on driving information satisfying a first condition, release a restriction on the acceleration of the engine of the vehicle in the activated state of the fuel-conservation mode.

In some implementations, the controller may be further configured to, based on the driving information having satisfied the first condition, subsequently restrict the acceleration of the engine based on the driving information not satisfying the preset condition in a state in which the accelerator pedal is pressed with the force greater than the threshold force in the activated state of the fuel conservation mode.

In some implementations, the controller may be configured to activate or deactivate the fuel conservation mode based on the driving information, regardless of the user input.

In some implementations, a display may be disposed in the vehicle and the controller may be further configured to: control the display to output a graphic object indicating the activated state of the fuel conservation mode in a state in which the fuel conservation mode is activated; and control the graphic object to disappear from the display based on the fuel conservation mode being deactivated.

In some implementations, the controller may be configured to deactivate the fuel conservation mode in a state in which the vehicle executes a lane change while the accelerator pedal is pressed with the force greater than the threshold force.

In some implementations, the controller may be further configured to, in the state in which the vehicle executes the lane change while the accelerator pedal is pressed with the force greater than the threshold force, deactivate the fuel conservation mode based on a second vehicle being detected at a rear side of a new lane for the lane change within a predetermined distance, and based on a speed of the second vehicle being greater than a speed of the vehicle.

In some implementations, the controller may be further configured to: deactivate the fuel conservation mode based on the vehicle executing the lane change from a first lane to a second lane while the accelerator pedal is pressed with the force greater than the threshold force; and activate the fuel conservation mode based on the vehicle executing a second lane change from the second lane to the first lane.

In some implementations, the controller may be further configured to deactivate the fuel conservation mode based on the accelerator pedal being pressed with the force greater than the threshold force in a state in which an inclination of an uphill portion of a road on which the vehicle is travelling is greater than a threshold inclination.

In some implementations, the controller may be further configured to deactivate the fuel conservation mode based on the accelerator pedal being pressed with the force greater than the threshold force based on a traffic light being detected within a predetermined distance in a driving direction of the vehicle, and the traffic light outputting at least one of a stop signal, a warning signal, or a proceed signal.

In some implementations, the controller may be further configured to deactivate the fuel conservation mode based on the accelerator pedal being pressed with the force greater than the threshold force in a stopped state of the vehicle.

In some implementations, the controller may be further configured to activate the fuel conservation mode based on a second vehicle being sensed at a front side in a driving direction of the vehicle in a state in which the accelerator pedal is pressed with the force greater than the threshold force.

In some implementations, the controller may be further configured to deactivate the fuel conservation mode based on a second vehicle being sensed at a rear side in a driving direction of the vehicle in a state in which the accelerator pedal is pressed with the force greater than the threshold force in a stopped state of the vehicle; and maintain the fuel conservation mode based on the second vehicle not being sensed at the rear side in the driving direction of the vehicle.

In some implementations, the driving information satisfying the first condition may correspond to a scenario in which an object is detected having a likelihood of colliding with the vehicle in a driving direction of the vehicle, and the vehicle executing a steering operation to evade the detected object.

In some implementations, the sensor may be configured to sense a weight of a load inside the vehicle, and the controller may be configured to change the threshold force based on the weight of the load inside the vehicle.

In some implementations, the controller may be configured to: set the threshold force to a first threshold force based on the weight of the load inside the vehicle being smaller than a threshold weight; and set the threshold force to a second threshold force greater than the first threshold force based on the weight of the load inside the vehicle being equal to or greater than the threshold weight.

In another aspect, a vehicle control device may include a display disposed in a vehicle, and a controller. The controller may be configured to: control the display to output a graphic object indicating an activated state of a fuel conservation mode of the vehicle, based on the fuel conservation mode being activated and restricting acceleration of an engine of the vehicle; control the display to output notification information indicating that an accelerator pedal of the vehicle is being pressed with a force greater than a threshold force, based on the accelerator pedal being pressed with the force greater than the threshold force in an activated state of the fuel conservation mode; and deactivate the fuel conservation mode based on the accelerator pedal being pressed in a predetermined manner while the notification information is being output.

In some implementations, the predetermined manner in which the accelerator pedal is pressed may correspond to the accelerator pedal being pressed with a force greater than a force with which the accelerator pedal is pressed in the case of outputting the notification information.

In some implementations, the vehicle control device may further include a sensor configured to sense driving information of the vehicle, and the controller may be configured to maintain the fuel conservation mode based on the driving information satisfying a first condition, even if the accelerator pedal is pressed in the predetermined manner while the notification information is being output.

In some implementations, the driving information satisfying the predetermined condition may correspond to the vehicle exceeding a speed limit of a road on which the vehicle is travelling as the acceleration of the vehicle reaches a level corresponding to a pressurization degree of the accelerator pedal.

In some implementations, the controller may be further configured to, subsequent to the fuel conservation mode being deactivated as the accelerator pedal is pressed in the predetermined manner, re-activate the fuel conservation mode based on the accelerator not being pressed or based on the accelerator pedal being pressed with a force that is less than the threshold force.

Further scope of applicability of the present application will become more apparent from the detailed description given hereinafter. However, it should be understood that the detailed description and specific examples are given by way of illustration only and that various changes and modifications within the spirit and scope of the disclosure may be made.

DETAILED DESCRIPTION

Figure 1:
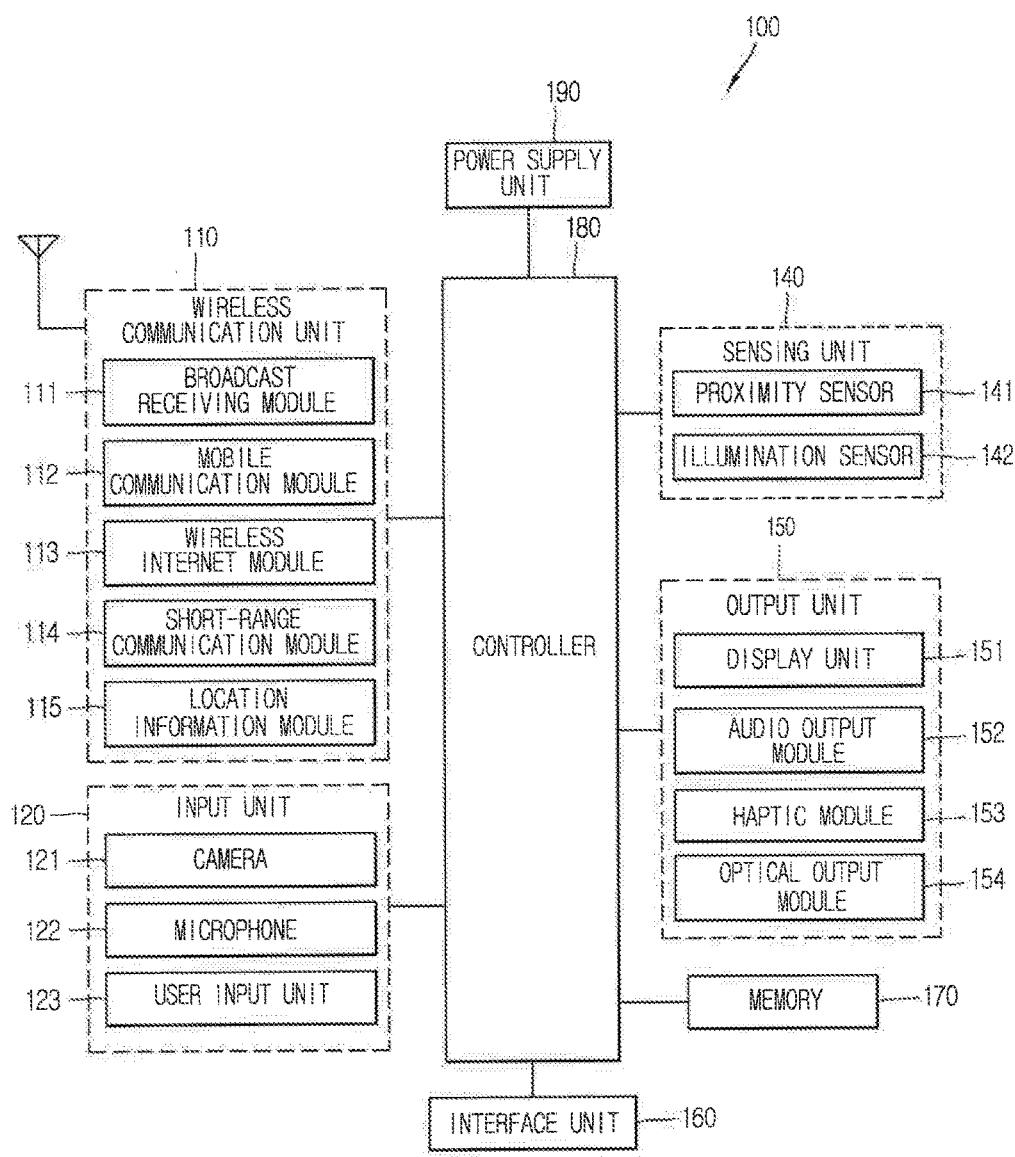
FIG. 1 is a block diagram illustrating an example of a vehicle control device according to some implementations.

Implementations described herein provide a vehicle control device that selectively engages or disengages a fuel conservation mode of a vehicle based on information that is sensed in or around the vehicle.

The fuel efficiency performance of a vehicle typically depends on several factors including road situations, peripheral situations, driving habits, etc. Fuel efficiency performance is often enhanced by restricting the driving habit among the above factors. For example, fuel may be conserved by a driver slowly accelerating a vehicle at 5 seconds after driving, with 20 Km per hour. As such, fuel may be conserved by a driver restricting rapid acceleration of the vehicle.

Some vehicles may be provided with a fuel-conservation mode in which rapid acceleration of the vehicle is automatically restricted. Such a fuel conservation mode may be referred to as an economy mode or "eco mode," Once the eco mode is executed, acceleration and/or a maximum speed of the vehicle are restricted, even if a driver presses an accelerator pedal with a high force. Accordingly, rapid acceleration is limited and fuel-conservation may be improved.

However, in a state in which the eco mode is activated, a driver may not be able to execute rapid acceleration in a situation requiring such rapid acceleration. For instance, when the driver attempts to accelerate to merge with traffic or to pass another vehicle in traffic in a state in which an eco mode is activated, the eco mode may restrict acceleration of the vehicle and thus prolong the time it takes for the vehicle which has entered an overtaking lane to overtake the other vehicle or to merge with traffic. In such scenarios, the eco mode may cause inconvenience or even increase a risk of driving.

Implementations described herein provide a vehicle control device configured to operate a fuel-conserving eco mode of a vehicle in an intelligent manner. For example, the vehicle control device may selectively activate or deactivate an eco mode based on sensing conditions inside or outside the vehicle.

In some scenarios, the vehicle control device according to the present disclosure may have the following advantages.

Firstly, since an eco mode is automatically turned on/off according to a driver's intention to execute rapid acceleration and/or according to a driving situation, a driver may execute rapid acceleration in a situation requiring such rapid acceleration, while enhancing fuel efficiency.

Secondly, since the eco mode is turned on/off according to different situations (e.g., a smart eco mode is provided), a larger number of drivers may comfortably use the eco mode. This may enhance fuel efficiency of vehicles, and may reduce waste of fuel.

Thirdly, since a driver does not need to input a user input to turn on/off the eco mode each time, the driver may enjoy driving a vehicle and convenience of driving may be enhanced.

The vehicle control device according to the present disclosure may be a device for controlling at least one component provided at a vehicle, in an electronic manner. As an example, the vehicle control device may be an electronic control unit (ECU).

The vehicle control device may be implemented using a variety of different types of terminals. Examples of such terminals include not only mobile terminals such as cellular phones, smart phones, laptop computers, digital broadcast terminals, personal digital assistants (PDAs), portable multimedia players (PMPs), navigators, slate PCs, tablet PCs, ultra books, and wearable devices, but also stationary terminals such as digital TVs, desktop computers and a digital signage.

FIG. 1 is a block diagram illustrating an example of a vehicle control device according to the present disclosure.

The vehicle control device 100 is shown to have components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the vehicle control device 100 and a wireless communication system, communications between the vehicle control device 100 and another mobile terminal, communications between the vehicle control device 100 and an external server. Further, the wireless communication unit 110 typically includes one or more modules which connect the vehicle control device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the vehicle control device 100 and a user, as well as function as the user input unit 123 which provides an input interface between the vehicle control device 100 and the user.

The interface unit 160 serves as an interface with various types of external devices that may be coupled to the vehicle control device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the vehicle control device 100 may perform assorted control functions associated with a connected external device, in response to the external device being connected to the interface unit 160.

The memory 170 is typically implemented to store data to support various functions or features of the vehicle control device 100. For instance, the memory 170 may be configured to store application programs executed in the vehicle control device 100, data or instructions for operations of the vehicle control device 100, and the like. Some of these application programs may be downloaded from an external server via wireless communication. Other application programs may be installed within the vehicle control device 100 at time of manufacturing or shipping, which is typically the case for basic functions of the vehicle control device 100 (for example, receiving a call, placing a call, receiving a message, sending a message, and the like). Application programs may be stored in the memory 170, installed in the vehicle control device 100, and executed by the controller 180 to perform an operation (or function) for the vehicle control device 100.

The controller 180 typically functions to control overall operation of the vehicle control device 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 may be configured to receive external power or provide internal power in order to supply appropriate power required for operating elements and components included in the vehicle control device 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various implementations to be explained later. The operation or the control method of the vehicle control device may be implemented on the vehicle control device by driving at least one application program stored in the memory 170.

Hereinafter, the display unit 151 will be explained in more detail, before various implementations of the vehicle control device 100 are explained.

The display unit 151 is generally configured to output information processed in the vehicle control device 100. For example, the display unit 151 may display execution screen information of an application program executing at the vehicle control device 100 or user interface (UI) and graphic user interface (GUI) information in response to the execution screen information.

The display unit 151 may be implemented in two or more according to an implementation type of the vehicle control device 100. For instance, a plurality of the display units 151 may be arranged on one side, either spaced apart from each other, or these devices may be integrated, or these devices may be arranged on different surfaces.

The display unit 151 may include a touch sensor which senses a touch input applied to the display unit 151, such that a control command may be input in a touch manner.

More specifically, the display unit 151 may be provided with a display and a touch sensor. And the display and the touch sensor may be operated in a cooperating manner under control of the controller 180. For instance, when a touch is input to the display unit 151, the touch sensor may be configured to sense this touch and the controller 180, for example, may generate a control command or other signal corresponding to the touch. The controller 180 may sense a touch applied to the touch sensor even in an off state of the display, and may execute a control corresponding to the sensed touch. Content which is input in a touching manner may be a text or a numerical value, or a menu item which may be indicated or designated in various modes.

The display unit 151 may also form a touch screen together with the touch sensor. Here, the touch screen may serve as the user input unit 123 (see FIG. 1).

Various implementations described herein may be implemented in a computer-readable medium, a machine-readable medium, or similar medium using, for example, software, hardware, or any combination thereof.

Hereinafter, the drawings will be explained in a clockwise or downward direction, from the upper left drawing.

The vehicle control device may control various components provided in a vehicle. Further, the vehicle control device may connect the components to each other, or may transmit a different control signal to each of the components by combining information received from the components.

For instance, the components may include a power source, a driving manipulation unit, and at least one wheel rotated by the power source.

The power source includes an engine, a mechanical apparatus for converting energy of thermal power, water power, electric power, etc. into mechanical energy. For instance, the power source may include at least one of an engine and a motor.

The driving manipulation unit receives a user input for driving. The driving manipulation unit may include at least one of a steering wheel, an accelerator pedal, and a brake pedal.

The steering wheel may receive a driving direction of a vehicle, from a driver.

A rotation sensor is connected to the steering wheel, and the rotation sensor may sense at least one of whether the steering wheel has rotated or not, a rotation direction, a rotation displacement, and a rotation speed.

Wheels include a steering wheel. The steering wheel may be a wheel of which direction is converted according to a steering input inputted to the steering wheel. The steering wheel and the steering wheel may be connected to each other mechanically or electrically.

The accelerator pedal may receive an input for acceleration of the vehicle, from the driver.

The accelerator pedal may be in one of a first state (a minimum state) where it is not pressed, and a second state (a maximum state) where it is pressed to the maximum. The controller controls an output from the power source (or engine) based on a position of the accelerator pedal.

As the accelerator pedal is pressed much, an output from the power source becomes larger. The output from the power source may be calculated in the form of an RPM, a torque and/or a horsepower.

A first position sensor may be further provided to sense a position of the accelerator pedal. The first position sensor may sense at least one of whether the accelerator pedal is pressed or not, a pressurization speed and a pressurization degree.

The controller may execute a speed change based on a position of the accelerator pedal and a driving speed.

The brake pedal may receive an input for deceleration of the vehicle, from the driver.

A second position sensor is connected to the brake pedal, and the second position sensor may sense at least one of whether the brake pedal is pressed or not, a pressurization speed and a pressurization degree.

The driving manipulation unit may further include an actuator configured to apply a force to the accelerator pedal such that a driver feels resistance when pressing the accelerator pedal.

The actuator may provide power to the accelerator pedal under control of the controller, such that the accelerator pedal may not be pressed with a force less than a predetermined level. The actuator may include a motor, a solenoid, a pneumatic actuator, an electric actuator, a hydraulic actuator, etc.

For instance, the accelerator pedal may be pressed with a force higher than a reference in an eco mode. More specifically, the accelerator pedal may be in one of a first state where it is not pressed, and a second state where it is pressed to the maximum. And the accelerator pedal may be pressed with a force higher than a reference by a driver. Once the accelerator pedal reaches the reference state, the controller may control the accelerator pedal not to be pressed with a force less than a predetermined level, using the actuator.

Figure 2:
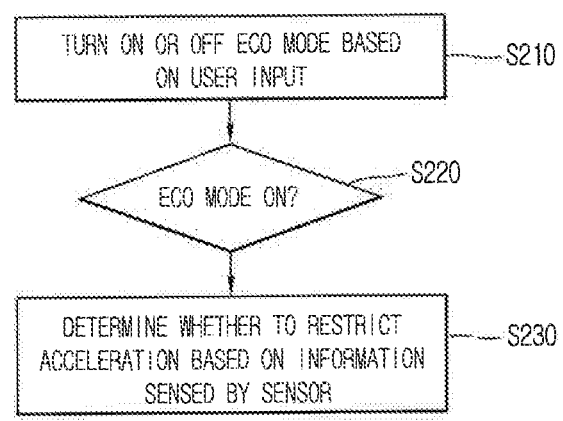
FIG. 2 is a flowchart illustrating an example of controlling the vehicle control device shown in FIG. 1.
Figure 3:
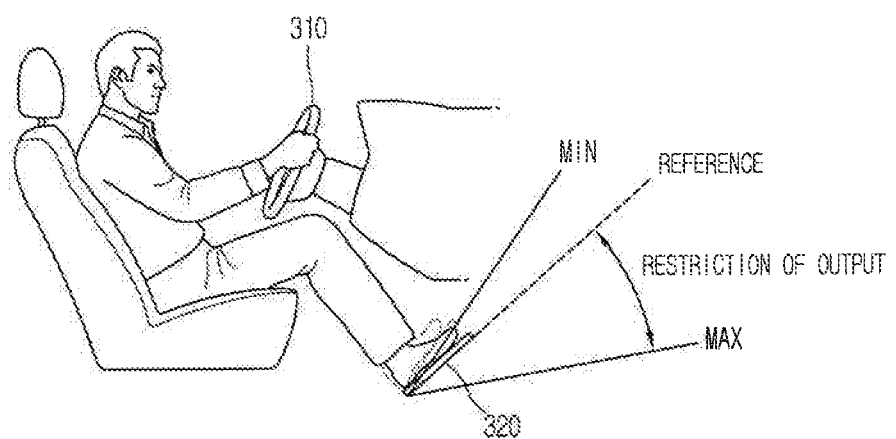
FIG. 3 is a diagram illustrating an example of restricting acceleration based on a fuel-conservation mode of a vehicle.

FIG. 2 is a flowchart to explain a method to control the vehicle control device shown in FIG. 1, and FIG. 3 is a diagram illustrating an example of restricting acceleration based on an eco mode.

Firstly, the controller turns on or turns off an eco mode based on a user input (S210).

The eco mode may be a function that restricts acceleration of a power source, such as an engine, of the vehicle, which may have the effect of enhancing fuel efficiency.

In a deactivated state of an eco mode (e.g., a state in which the eco mode is off), an output from a power source is increased as an accelerator pedal is pressed. For instance, in a case where the power source is an engine, a pressurization degree of the accelerator pedal and a revolution per minute (RPM) are proportional to each other in an assumption that a speed change does not occur. If a speed change occurs, an RPM is variable according to the speed change. However, in this case, an output from the power source is increased as the accelerator pedal is pressed. As such, as the accelerator pedal is pressed, acceleration is executed without limitation within an acceleration range of the engine.

On the contrary, in an activated state of an eco mode (e.g., a state in which the eco mode is on), an output from a power source is restricted within a predetermined range. As such, when an accelerator pedal is pressed, acceleration is executed to a level lower than a preset level corresponding to a pressurization degree of the accelerator pedal.

Referring to FIG. 3, if an accelerator pedal 320 is pressed to a level equal to or lower than a reference level, an output corresponding to a pressurization degree is generated. On the other hand, if the accelerator pedal 320 is pressed to a level higher than the reference level, an output having a size smaller than a preset size in an eco mode 'off' state is generated. For instance, in a case where a power source is an engine in an assumption that a speed change does not occur, even if the accelerator pedal 320 is pressed to a maximum state (MAX), an RPM is maintained at a preset level. For example, if the accelerator pedal 320 is positioned within an output limitation range, an output from a power source is limited to a preset level, regardless of a pressurization degree of the accelerator pedal 320. Thus, even if the accelerator pedal 320 is pressed in an activated state of an eco mode, acceleration is smoothly executed according to a preset algorithm.

The preset algorithm may be an algorithm to execute acceleration with minimizing fuel consumption according to a driving speed and the number of gears at the time of driving, and may be variously modified according to an implementation.

As one example, if the vehicle reaches a preset maximum speed, a power source may generate only an output to maintain the highest speed, even if the accelerator pedal is pressed to a level higher than the reference level.

As another example, if the accelerator pedal 320 is pressed within a first range, acceleration is executed within a range of 2000 rpm. If the accelerator pedal is pressed to a level higher than the first range, acceleration may be executed to a level higher than the 2000 rpm. However, acceleration may be executed to a level lower than a preset level corresponding to a pressurization degree of the accelerator pedal 320.

Once an eco mode is activated, fuel efficiency is enhanced, and only fuel required to maintain a driving speed is consumed, even if acceleration for minimization of fuel consumption is executed. However, in the same conditions, it takes a longer time to reach a desired speed in the activated state of the eco mode, than in a deactivated state of the eco mode.

In the eco mode, the reference may be variable according to at least one of a driving speed, an RPM, the number of gears at the time of driving, a total weight of loads and persons inside a vehicle, and a type of a road on which a vehicle is running. More specifically, the controller may change or reset the reference based on the at least one.

For instance, if a driving speed is within a first range, the reference may be set as a first reference value. And if a driving speed is higher than the first range, the reference may be set as a second reference value larger than the first reference value. This may correspond to a scenario in which acceleration at a low gear is executable even by a small force, whereas acceleration at a high gear is executable by a larger force.

As another example, if a total weight of loads and persons inside a vehicle is smaller than a reference weight, the reference may be set as a third reference value. And if the total weight is equal to or larger than the reference weight, the reference may be set as a fourth reference value larger than the third reference value. This may account for a vehicle of a larger weight requiring a larger force than a smaller vehicle to achieve the same acceleration.

As such, the reference may be changed to have a larger value as a relatively higher force is required to generate acceleration of a specific level.

Here, a larger reference value may correspond to a pressed state of the accelerator pedal with a relatively higher force.

Referring to FIG. 2 back, the eco mode may be activated or deactivated by a user input (S210). The eco mode for enhancing fuel efficiency with restricting acceleration is turned on/off by a user input.

The vehicle or the vehicle control device may further include a user input unit configured to turn on/off an eco mode. If the user input unit is pressed in an activated state of an eco mode, the eco mode is deactivated. On the contrary, if the user input unit is pressed in a deactivated state of the eco mode, the eco mode is activated.

The user input unit may be formed as a key pad, a dome switch, a touch pad, a jog wheel, a jog switch, a microphone, etc. If the user input unit is formed as a microphone, the eco mode may be turned on/off based on a voice command received by the microphone.

Next, in an activated state of the eco mode (S220), the controller determines whether to restrict acceleration or not, based on information sensed by the sensor (S230).

For example, the vehicle or the vehicle control device may include at least one sensor configured to sense driving information of the vehicle. The controller may determine whether a driving situation satisfies a preset condition based on sensed driving information, and may restrict acceleration according to a result of the determination.

In some scenarios of an eco-mode, when an accelerator pedal is pressed with a force higher than a reference, an output is restricted regardless of driving information.

By contrast, in the present disclosure, if driving information satisfies a preset condition, an output is not restricted even in an eco mode. More specifically, an output having a size corresponding to a pressurization degree of the accelerator pedal is generated. As such, an eco mode may be temporarily deactivated regardless of a user input.

The driving information may be various types of vehicle-related information sensed by sensors.

For example, the driving information may include a driver's driving information and/or vehicle driving information.

The driver's driving information may include a driver's intention sensed by a user input applied to the driving manipulation unit. For instance, if a directional signal (e.g., a turn signal) is turned on in a direction of an overtaking lane, it may be interpreted as a driver's intention to change a lane for passing (e.g., overtaking).

The vehicle driving information may include driving-related information sensed from a vehicle and/or a peripheral situation of the vehicle, such as a driving speed, a weight, a possibility of collision, and a road characteristic (e.g., a road type such as an unpaved road, a highway and a crossroad, and a curvature of a lane at a curved section, a limitation speed set to a road, etc.).

The vehicle driving information may include, for example, position information such as GPS, various types of information analyzed from images obtained by an image sensor, an object sensed by a radar or a laser radar (light detection and ranging), a likelihood of collision with the sensed object, etc.

The preset condition for the driving information may correspond to a driving scenario in which the vehicle should be accelerated in a temporarily-released state of the eco mode. For instance, in a scenario of the vehicle overtaking another vehicle by entering an overtaking lane, the overtaking should be rapidly executed for smooth traffic, and acceleration should be executed at a level greater than a restricted level in the eco mode. This is an example of a scenario where the driving information satisfies a preset condition. In this case, acceleration is not restricted by the eco mode.

The preset condition may be set in various ways. For example, the preset condition may be preset by a manufacturing company of the vehicle or the vehicle control device. The preset condition may be preset at the factory, and may be reset by a user or may be updated by a manufacturing company after release (delivery). For instance, a manufacturing company may set a situation where a driver converts an activated state of the eco mode into an deactivated state of the eco mode, as big data. Then, the manufacturing company may update the preset condition, for deactivation of the eco mode without a user input when the situation occurs.

A case where driving information satisfies a preset condition will be further explained with reference to FIGS. 7A to 11D.

A process to determine whether to restrict acceleration or not, will be explained in more detail with reference to FIG. 4.

Figure 4:
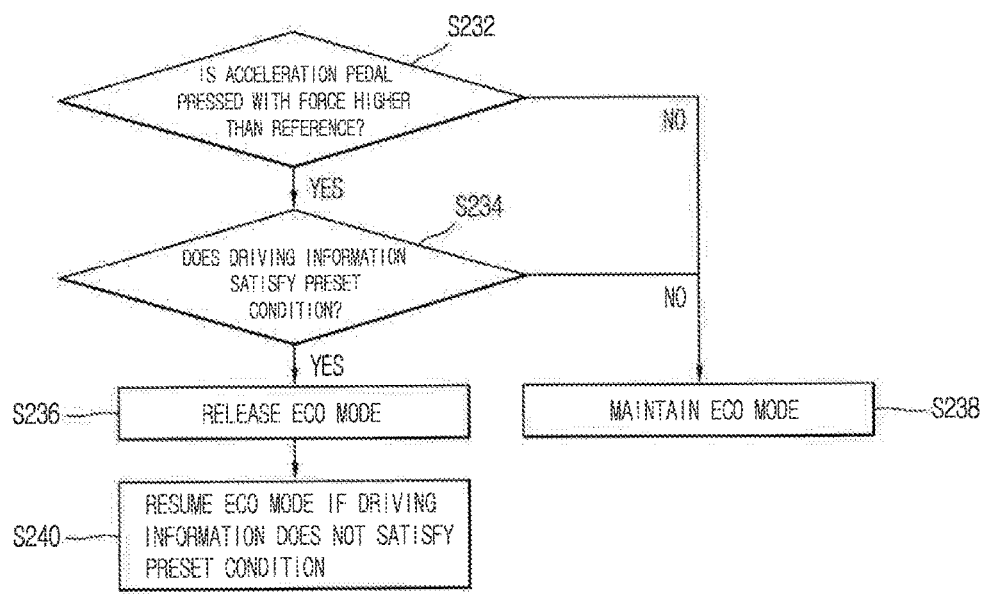
FIG. 4 is a flowchart illustrating an example of the control technique of FIG. 2 in more detail.

FIG. 4 is a flowchart illustrating the control method of FIG. 2 in more detail.

The determining whether to restrict acceleration or not (S230) may include determining whether the accelerator pedal is pressed with a force higher than a reference (S232).

If the accelerator pedal is pressed with a force equal to or lower than the reference, an eco mode is maintained, and this scenario may correspond to an output corresponding to a pressurization degree of the accelerator pedal being generated regardless of the eco mode (S238).

On the contrary, if the accelerator pedal is pressed with a force higher than the reference, the controller determines whether driving information satisfies a preset condition (S234). In a situation where the eco mode should be temporarily released, e.g., when driving information satisfies a preset condition, the eco mode is released (S236). However, when driving information does not satisfy the preset condition, the eco mode is maintained, and this may correspond to a scenario in which fuel efficiency should be prioritized over acceleration (S238).

If driving information does not satisfy the preset condition in a released state of the eco mode, the eco mode resumes (S240). More specifically, when driving information satisfies the preset condition, an output, such as acceleration, is not restricted since the eco mode is temporarily released. However, if driving information does not satisfy the preset condition, the eco mode resumes to restrict an output, such as acceleration.

In some implementations, the controller may activate or deactivate the eco mode based on the driving information, regardless of whether a user input has been applied to the user input unit.

In implementations where an eco mode is automatically turned on/off according to a driver's intention to execute rapid acceleration and/or according to a driving situation, a driver may execute rapid acceleration in a situation requiring such rapid acceleration, with enhancing fuel efficiency.

The vehicle control device may further include a display disposed in the vehicle. The controller may inform a driver of an on/off state of an eco mode, using the display.

Figure 5:
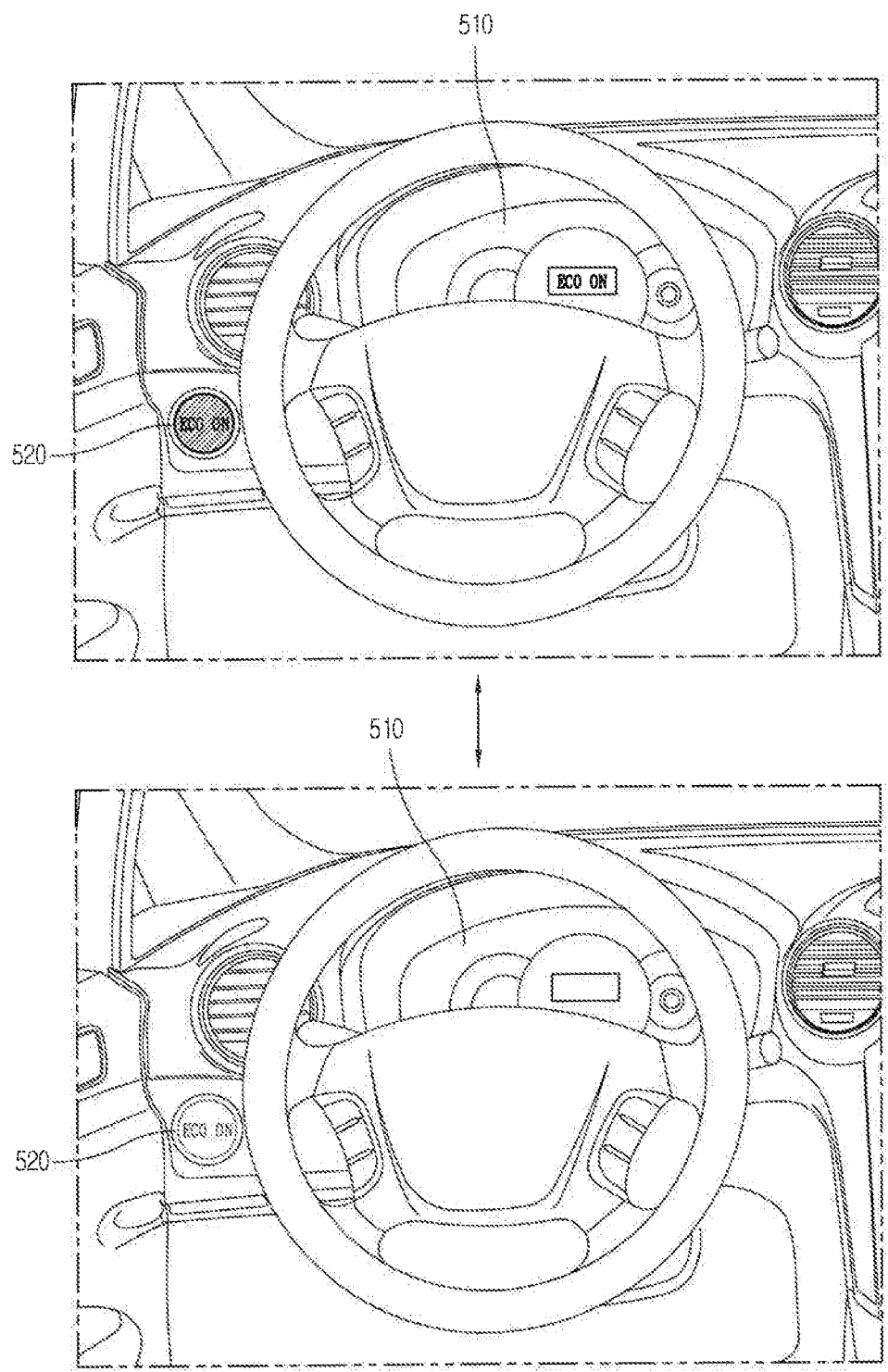
FIG. 5 is a diagram illustrating an example of an operation of a display according to an on/off state of a fuel-conservation mode of a vehicle.

FIG. 5 is an exemplary view illustrating an operation of a display according to an on/off state of an eco mode.

The vehicle or the vehicle control device may further include a display 510 configured to output visual information. For instance, as shown in FIG. 5, the display 510 may be formed on a cluster (or a gauge) disposed on a surface facing a driver's seat. However, the present disclosure is not limited to this, but may include various types of displays including a head up display.

In an activated state of an eco mode, the controller may control the display 510 to output a graphic object indicating the activated state of the eco mode. On the contrary, in a deactivated state of the eco mode, the controller may control the graphic object to disappear from the display 510.

The vehicle or the vehicle control device may further include a user input unit 520 configured to turn on/off an eco mode. The user input unit 520 may further include a light emitting unit such as a light emitting diode (LED). In an activated state of an eco mode, light may be emitted from the light emitting unit. This may allow a driver to recognize an on/off state of the eco mode.

Figure 6A:
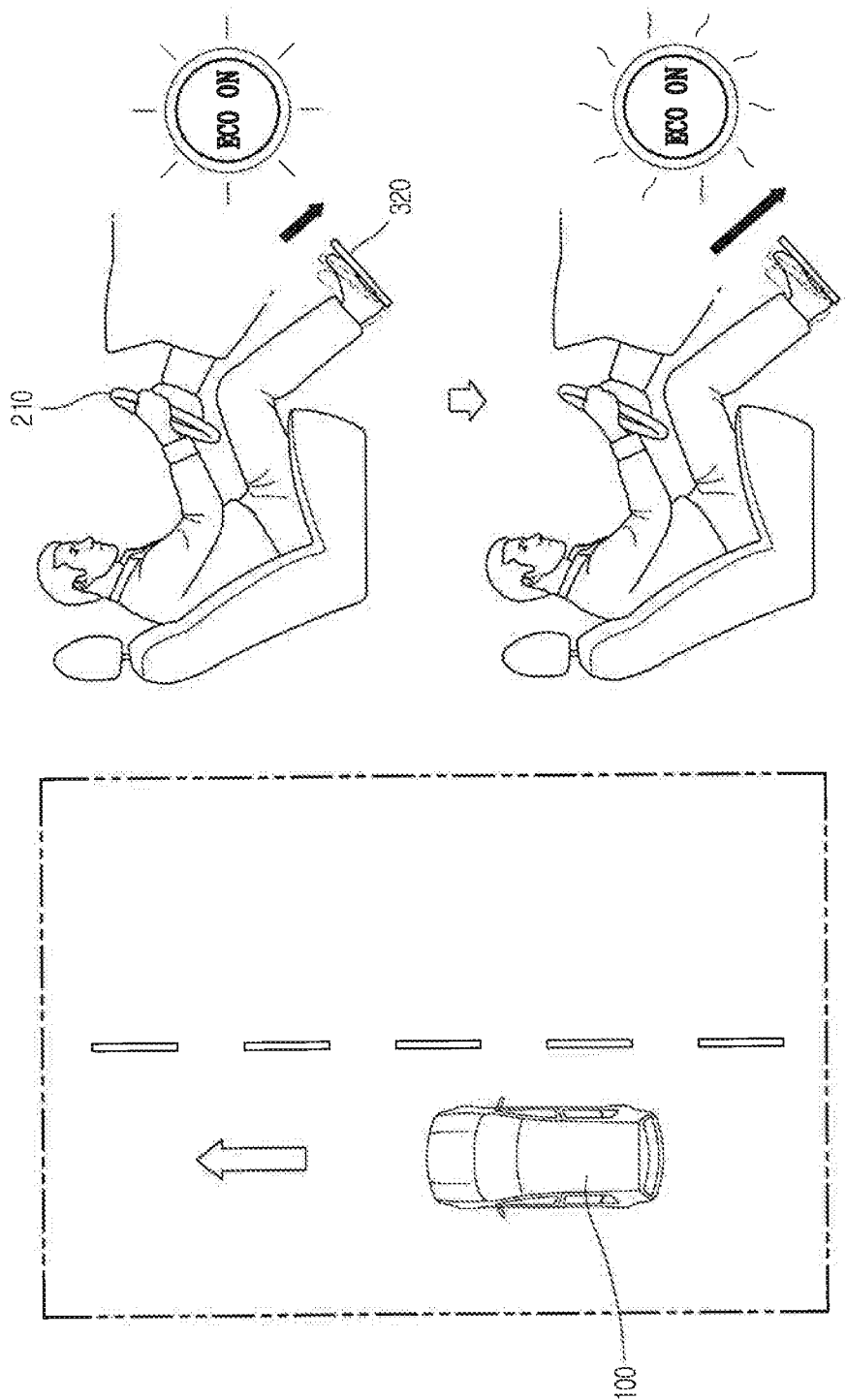
FIGS. 6A and 6B are diagrams illustrating examples of a display operation of a vehicle control device, in an activated state of a fuel-conservation mode of a vehicle.
Figure 6B:
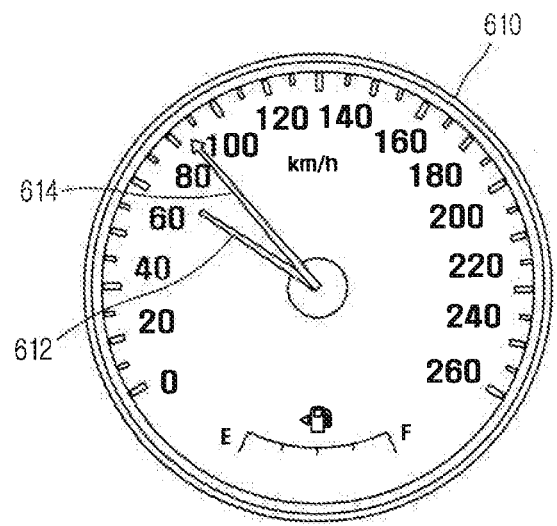

FIGS. 6A and 6B are diagrams illustrating a display operation of the vehicle control device, in an activated state of an eco mode.

Referring to FIG. 6A, when the accelerator pedal 320 is pressed with a force equal to or lower than a reference, the controller maintains an eco mode. In some implementations, the controller may control the display to output a graphic object indicating the activated state of the eco mode. For instance, an indication such as "ECO ON" may be output in green.

If the accelerator pedal 320 is pressed with a force higher than the reference in an activated state of the eco mode, the controller may control the display to output notification information indicating that the accelerator pedal 320 is being pressed with a force higher than the reference.

For instance, as shown in FIG. 6A, if the accelerator pedal 320 is pressed with a force equal to or lower than the reference in an activated state of the eco mode, alphabets "ECO ON" may be output in green. On the contrary, if the accelerator pedal 320 is pressed with a force higher than the reference in an activated state of the eco mode, alphabets "ECO ON" may be output in red.

Referring to FIG. 6B, the controller may control the display to output a speedometer 610 indicating a driving speed and/or a tachometer indicating an RPM of an engine.

The speedometer 610 includes a speed needle 612 indicating a driving speed, and the tachometer includes an RPM needle indicating an RPM at the time of driving.

If the accelerator pedal 320 is pressed with a force higher than the reference in an activated state of the eco mode, the controller may control an expected speed needle 614 to be displayed on the speedometer 610, the expected speed needle 614 indicating an expected speed in a deactivated state of the eco mode. For example, the controller may calculate a speed predicted in a deactivated state of the eco mode as an expected speed, and may display the expected speed needle 614 indicating the calculated expected speed, on the speedometer 610.

If the accelerator pedal 320 is pressed with a force higher than the reference in an activated state of the eco mode, the controller may control an expected RPM needle to be displayed on the speedometer, the expected RPM needle indicating an RPM predicted in a deactivated state of the eco mode.

The expected speed needle and the expected RPM needle may be included in notification information indicating that the accelerator pedal 320 is being pressed with a force higher than the reference.

A driver may visually check a restricted degree of an output, based on the speed needle 612 and the expected speed needle 614.

FIGS. 7A to 11D are diagrams illustrating examples of an operation of the vehicle control device of FIG. 1, which shows a case where driving information satisfies a preset condition.

Figure 7A:
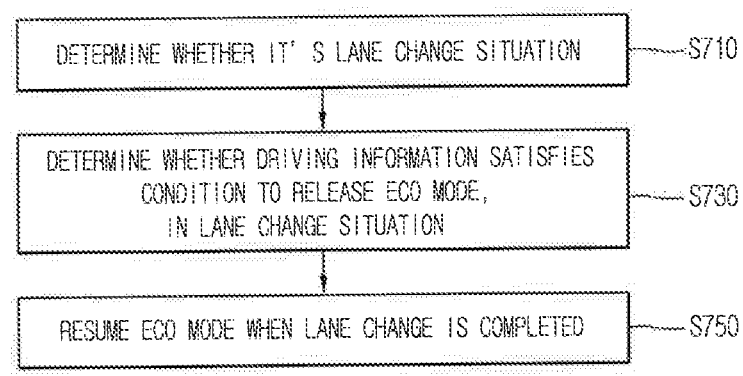
FIG. 7A is a flowchart illustrating an example of controlling a vehicle control device, in a situation of changing traffic lanes.
Figure 7B:
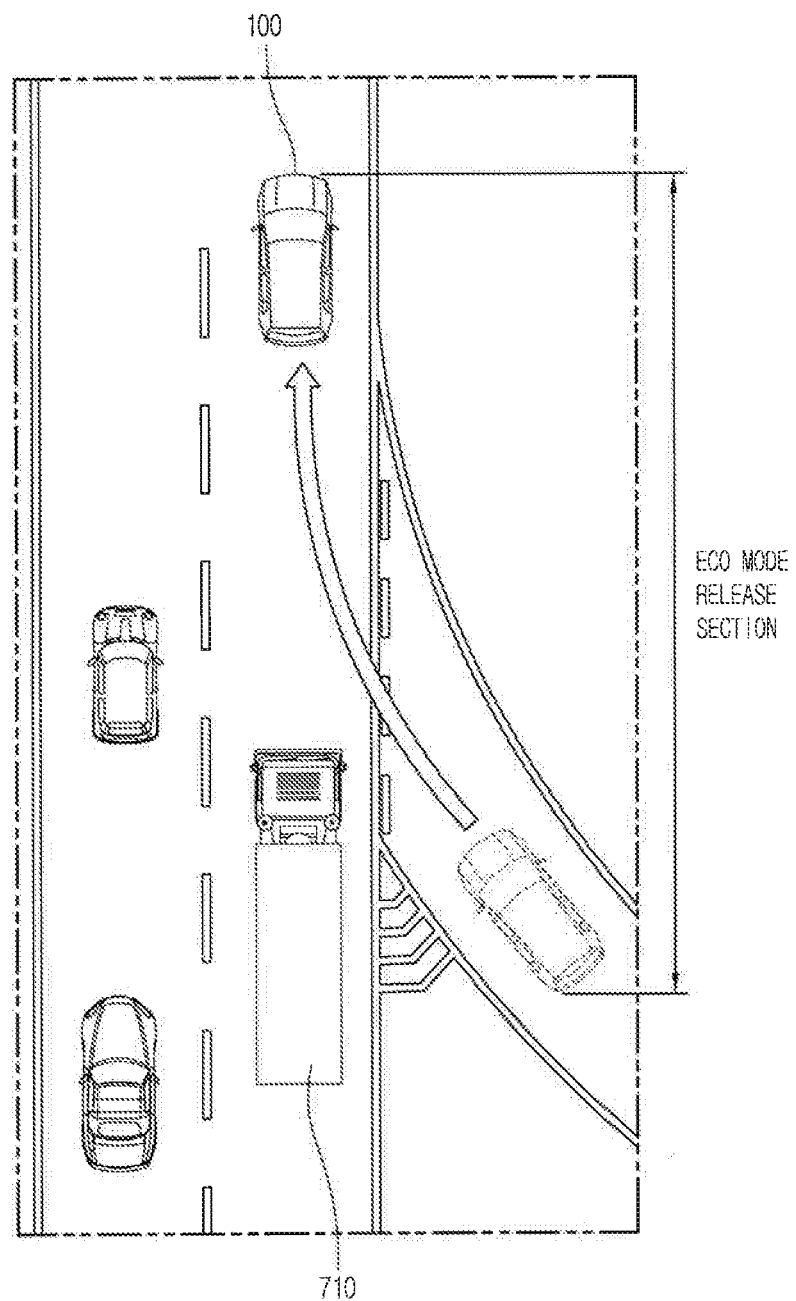
FIGS. 7B and 7C are diagrams illustrating examples of an operation of a vehicle control device by the control technique shown in FIG. 7A.
Figure 7C:
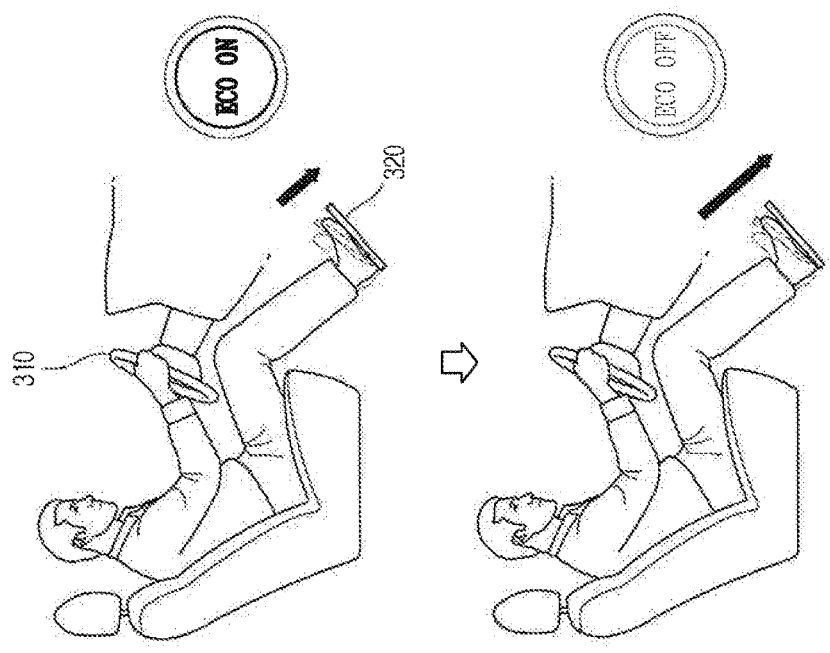
Figure 7C:
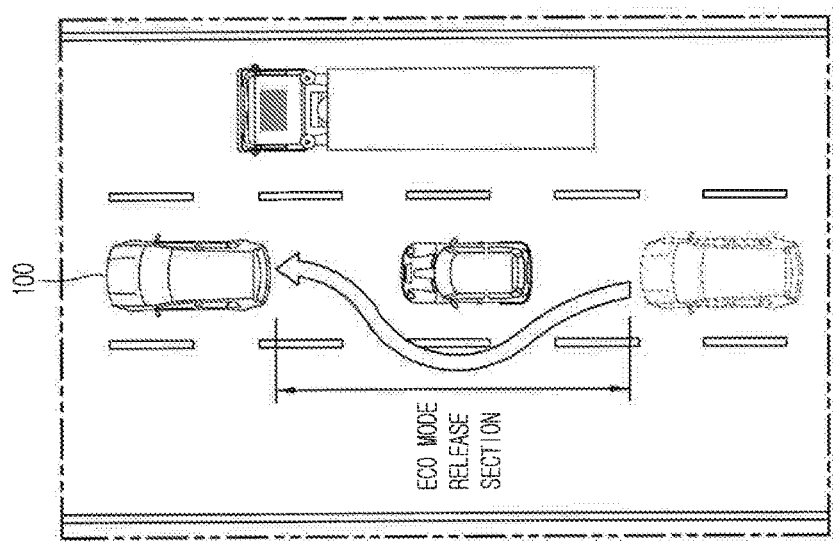

For instance, a case where driving information satisfies a preset condition in a lane change situation, is illustrated in FIGS. 7A to 7C.

More specifically, referring to FIG. 7A, the controller may determine whether to change a lane or not, based on driving information (S710).

The lane change situation may be determined in various manners. For instance, the controller may determine whether a directional signal has been turned on, whether a vehicle is running on a lane rather than a driving lane among a plurality of lanes captured by a camera, a rotation direction and a rotation degree of a steering wheel, etc. Then, the controller may determine whether to change a lane or not by synthetically analyzing sensed information.

Then, the controller may determine whether driving information satisfies a condition to release an eco mode, in the lane change situation (S730).

If a lane change occurs in a state where the accelerator pedal is pressed with a force higher than the reference, the controller deactivates the eco mode.

A time point when the eco mode is deactivated may be modified variously according to an implementation. For instance, if the accelerator pedal is pressed with a force higher than the reference in an on state of a directional signal, the eco mode may be deactivated at a moment when the accelerator pedal is pressed with a force higher than the reference. As another example, if the vehicle enters another lane rather than a driving lane while the accelerator pedal is pressed with a force higher than the reference, the eco mode may be deactivated at a moment of entering the other lane.

A condition to deactivate the eco mode in the lane change situation may be determined.

For instance, as shown in FIG. 7B, the controller may deactivate the eco mode, if another vehicle 710 is positioned at a rear side of a new lane for overtaking within a predetermined distance, and if a speed of said another vehicle 710 is higher than that of the vehicle. The eco mode may be maintained in a case where said another vehicle 710 is not present, or in a case where a speed of said another vehicle 710 is lower than that of the vehicle. As such, the controller may not need to execute an overtaking operation with releasing the eco mode.

If the overtaking by a lane change is completed, the controller determines that driving information does not satisfy a preset condition, and resumes the eco mode (S750).

For instance, as shown in FIG. 7C, the controller deactivates the eco mode when a lane change occurs from a first lane to a second lane, in a state where the accelerator pedal is pressed with a force higher than the reference. Then, if a lane change occurs from the second lane to the first lane, the controller re-activates the eco mode. As such, the controller may release an eco mode when the vehicle moves to an overtaking lane from a driving lane, and may resume the eco mode when the vehicle moves to the driving lane from the overtaking lane.

The controller may resume the eco mode if the accelerator pedal is pressed with a force equal to or lower than the reference, after the lane change to the second lane is completed. For example, this may correspond to a scenario in which a driver does not wish to continue the acceleration.

In some scenarios, such implementations may address a problem that traffic flow is not smooth when acceleration is restricted in a lane change situation due to an eco mode, or a problem that a driver is hampered in performing an overtaking operation due to an eco mode.

Figure 8A:
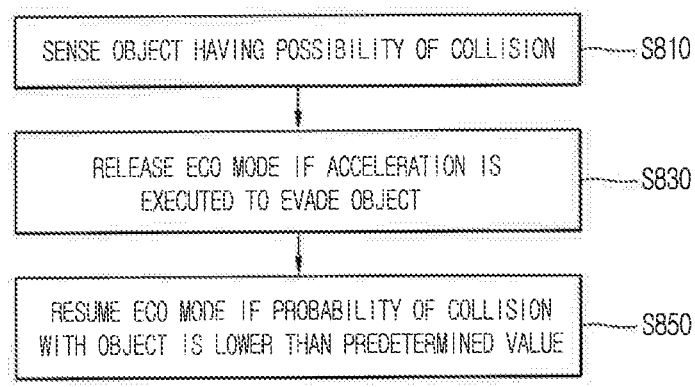
FIG. 8A is a flowchart illustrating an example of controlling a vehicle control device in an evasion steering situation.
Figure 8B:
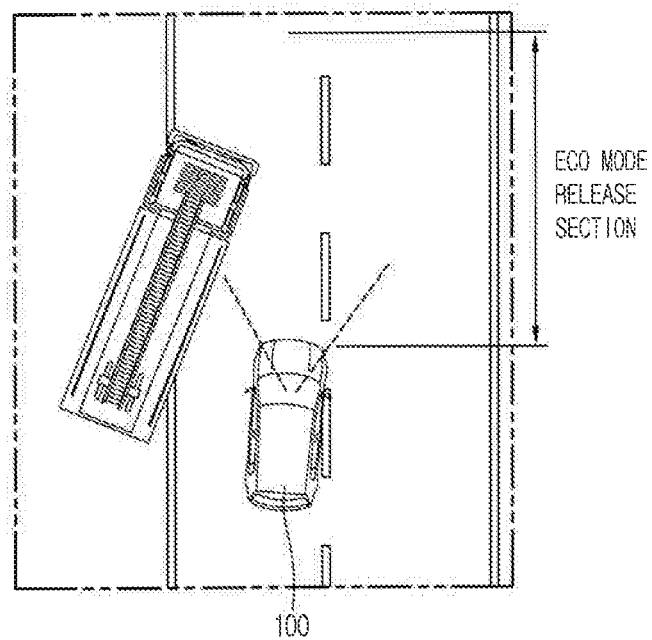
FIG. 8B is a diagram illustrating an example of an operation of a vehicle control device by the control technique shown in FIG. 8A.

FIG. 8A is a flowchart illustrating an example of controlling the vehicle control device in an evasion steering situation, and FIG. 8B is a diagram illustrating an example of an operation of the vehicle control device by the control method shown in FIG. 8A.

Evasion steering may be executed when there is an object having a likelihood of collision. For example, the evasion steering may perform steering of a vehicle to evade an object based on a likelihood of collision with the object in a driving direction of the vehicle.

Firstly, the controller senses an object having a likelihood of collision (S810). The controller may sense an object disposed in a driving direction, using a sensor such as a radar, a laser radar, a camera and an infrared ray. Then, the controller may calculate a probability of colliding with the object.

Then, the controller may release the eco mode if it is determined that the accelerator pedal is pressed for the purpose of evasion of the sensed object (S830).

For example, if the accelerator pedal is pressed with a force higher than a reference, while the steering wheel is moved in a direction to evade the sensed object, then the controller may release the eco mode.

For instance, as shown in FIG. 8B, if there is an object having a possibility of collision in a driving direction, the driver may press the accelerator pedal with a higher force, with rotating the steering wheel, in order to evade the object. In this case, if acceleration is restricted in an eco mode, the driver may have an accident. In such scenarios, the controller may allow the driver to evade a collision by temporarily releasing the eco mode, to provide sufficient acceleration to evade the object.

Subsequently, if the possibility of colliding with the sensed object is lower than a predetermined value, the controller may resume the eco mode (S850).

The controller may check a road characteristic (e.g., a road property) based on various information, such as navigation information, GPS information, and images obtained by the camera. Using such information, the controller may determine an on/off state of an eco mode based on the checked road characteristic.

The road characteristic may include a road type such as an unpaved road, a highway and a crossroad, a curvature of a lane, a speed limit set to a road, etc.

Figure 9:
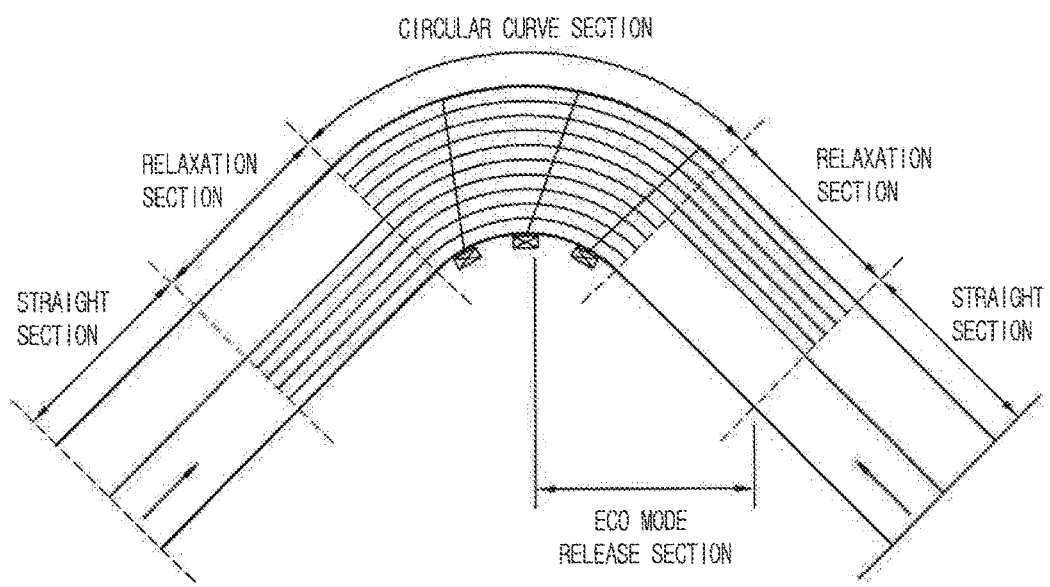
FIG. 9 is a diagram illustrating an example of an operation of a vehicle control device at a curved line section of a road.

Referring to the example of FIG. 9, if a curvature of a lane on which the vehicle is currently running, or a curvature of a lane where the vehicle is to run is more than a predetermined value, the controller deactivates the eco mode such that the driver executes acceleration. Then, if a curvature of a region which is out of the curved section is less than the predetermined value, the controller re-activates the eco mode.

Figure 10:
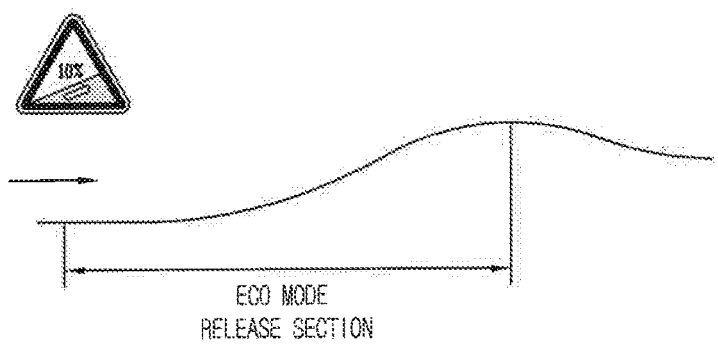
FIG. 10 is a diagram illustrating an example of an operation of a vehicle control device at an uphill section situation.

As another example, referring to FIG. 10, if the accelerator pedal is pressed with a force higher than the reference, in a state where an inclination of an uphill path of a driving road is larger than a predetermined value, the controller deactivates the eco mode. If an inclination of an uphill path of a driving road within a preset distance is larger than a predetermined value, the controller may deactivate the eco mode in order to obtain a propulsive force (e.g., a driving force) to climb the uphill path.

Then, if it is determined that the vehicle is out of the uphill path, the controller resumes the eco mode. More specifically, if an inclination of the uphill path of the driving road is lowered to a value less than the predetermined value, of if there is no uphill path having an inclination larger than the predetermined value within the preset distance, the controller may re-activate the eco mode.

FIGS. 11A to 11D are diagrams illustrating examples of an operation of the vehicle control device at a crossroad.

The controller may deactivate the eco mode when the accelerator pedal is pressed with a force higher than a reference, within a predetermined time in a stopped state of the vehicle, or when the accelerator pedal is pressed with a force higher than the reference while the vehicle is running at a driving speed lower than a predetermined speed.

As an example, the predetermined time may be a very short time, e.g., a time taken for a driver's foot to move from the brake pedal to the accelerator pedal.

The predetermined speed is a basis to determine whether the vehicle has entered a driving state as the accelerator pedal is pressed. The predetermined speed may be 10 km/h, for example. Even if the accelerator pedal is not pressed, the vehicle runs at a speed lower than the predetermined speed. Thus, if the accelerator pedal is pressed with a force higher than the reference while the vehicle runs at a driving speed lower than the predetermined speed, then it may be determined that the driver wishes to execute rapid acceleration. Accordingly, the controller may deactivate the eco mode.

On the contrary, the controller may maintain the eco mode when the accelerator pedal is pressed with a force higher than the reference in a state where the vehicle runs at a driving speed higher than the predetermined speed.

Deactivation of the eco mode may be limited to a case where another vehicle is sensed at a rear side of the vehicle.

For instance, the eco mode may be deactivated in a case where the accelerator pedal is pressed with a force higher than the reference, within a predetermined time in a stopped state of the vehicle, and in a case where other vehicle is sensed at a rear side of the vehicle relative to a driving direction. On the other hand, the eco mode may be maintained in a case where the accelerator pedal is pressed with a force higher than the reference, within a predetermined time in a stopped state of the vehicle, and in a case where other vehicle is not sensed at the rear side of the vehicle.

If no vehicle is sensed at a rear side in a driving direction, a driver may not need to execute rapid acceleration. On the other hand, if a vehicle is sensed at a rear side in a driving direction, then the driver may perform rapid acceleration for smooth traffic flow.

Figure 11A:
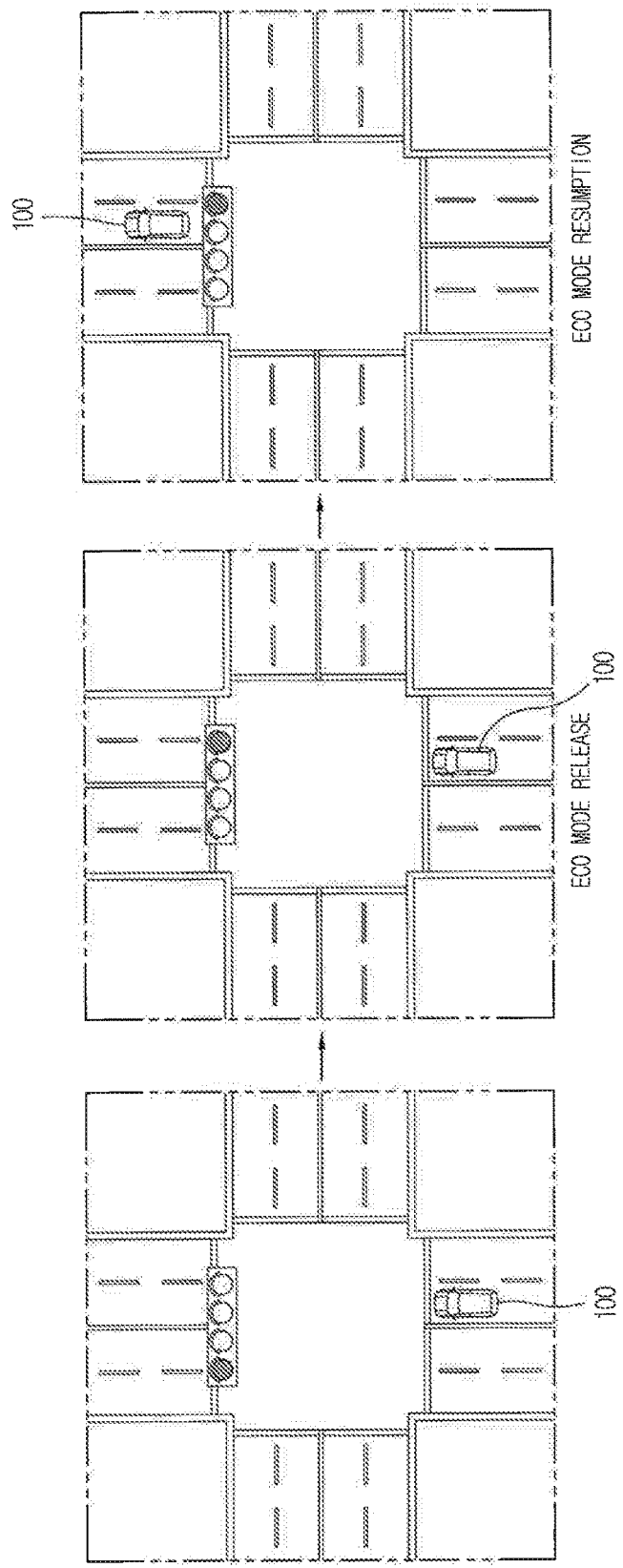
FIGS. 11A to 11D are diagrams illustrating examples of an operation of a vehicle control device at a crossroad situation.

As another example, referring to FIG. 11A, the vehicle should be out of a crossroad under a proceed signal (or a green light) and/or a warning signal (or a yellow light) on a driving road. In this scenario, other vehicles may be hindered by the vehicle. Thus, the controller deactivates the eco mode when the accelerator pedal is pressed with a force higher than the reference at a crossroad, and re-activates the eco mode when the vehicle is out of the crossroad.

More specifically, the controller may determine whether there exists a traffic light within a predetermined distance in a driving direction, the traffic light which outputs at least one of a stop signal, a warning signal and a proceed signal for the vehicle. The vehicle control device may determine a position of the traffic light based on images captured by the camera, GPS information, and V2X information received through the wireless communication unit.

The predetermined distance may change according to a driving speed of the vehicle. For instance, the predetermined distance may be a distance where the vehicle may reach within a reference time with a driving speed. For instance, when the vehicle runs at driving speeds of 20 km/h and 100 km/h, distances where the vehicle may reach within a reference time are different.

If the accelerator pedal is pressed with a force higher than the reference in a state where a traffic light is disposed within a predetermined distance in a driving direction, the controller deactivates the eco mode. As such, the controller does not limit acceleration such that the vehicle rapidly passes the traffic light. On the other hand, if there is no traffic light within a predetermined distance in a driving direction, even if the accelerator pedal is pressed with a force higher than the reference, the controller maintains the eco mode, for example to prioritize fuel efficiency over acceleration.

Figure 11B:
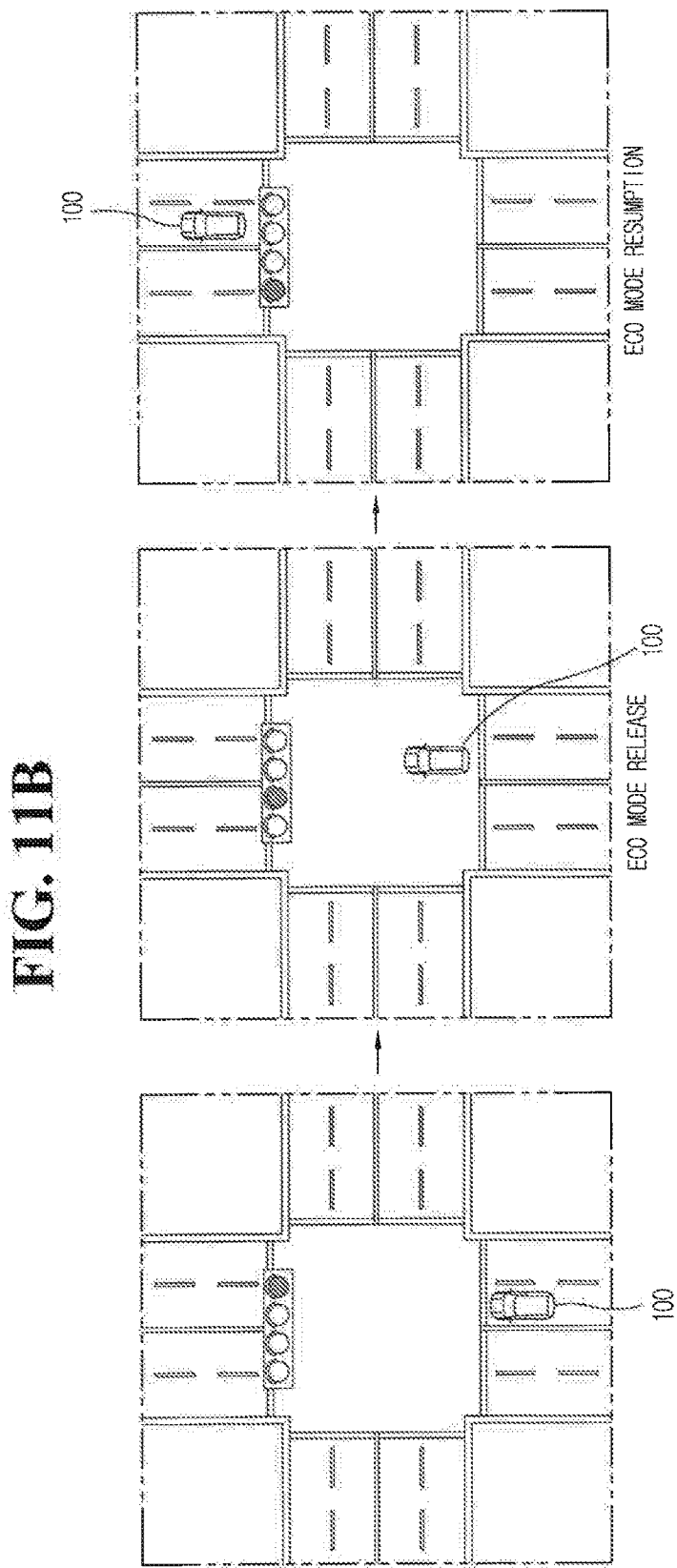

As another example, as shown in FIG. 11B, the controller may deactivate the eco mode if the accelerator pedal is pressed with a force higher than the reference while a traffic light disposed in a driving direction outputs a warning signal.

The warning signal is a signal indicating that the next signal is a stop signal. The vehicle should be stopped or should be out of a crossroad, in response to a warning signal. If the accelerator pedal is pressed with a force higher than the reference while a warning signal is being output, then it may be determined that a driver wishes to be rapidly out of the crossroad. Thus, the eco mode, where acceleration is limited, is deactivated.

The controller may check a signal of the traffic light, by using the camera or by communicating with the traffic light.

The controller may activate the eco mode if another vehicle is sensed at a front side in a driving direction, while the accelerator pedal is pressed with a force higher than the reference. This may correspond to a scenario in which acceleration is unnecessary when there is another vehicle at a front side.

Figure 11C:
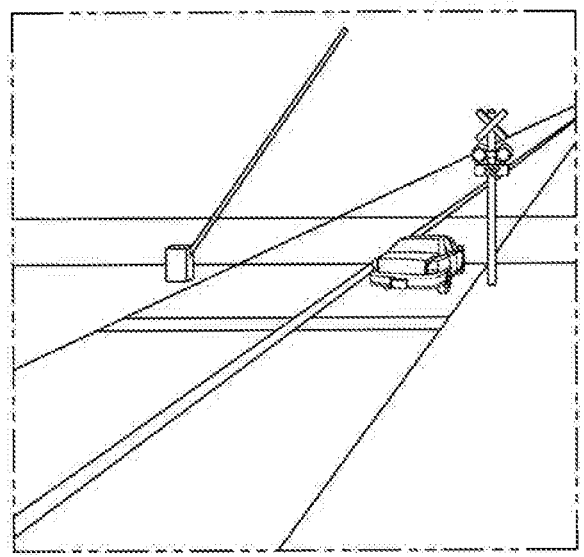

As shown in FIG. 11C, if the accelerator pedal is pressed with a force higher than the reference at a railroad crossing, the controller may deactivate the eco mode. Then, if the vehicle is out of the railroad crossing, the controller may re-activate the eco mode.

Figure 11D:
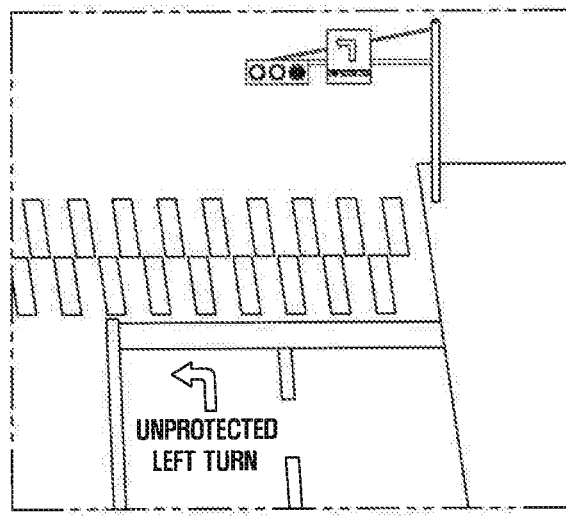

As shown in FIG. 11D, if the accelerator pedal is pressed with a force higher than the reference while the vehicle turns left at an intersection with no left-turn signal, the controller may deactivate the eco mode. Then, if the vehicle runs straight after completing the left turn, the controller may re-activate the eco mode.

Figure 12:
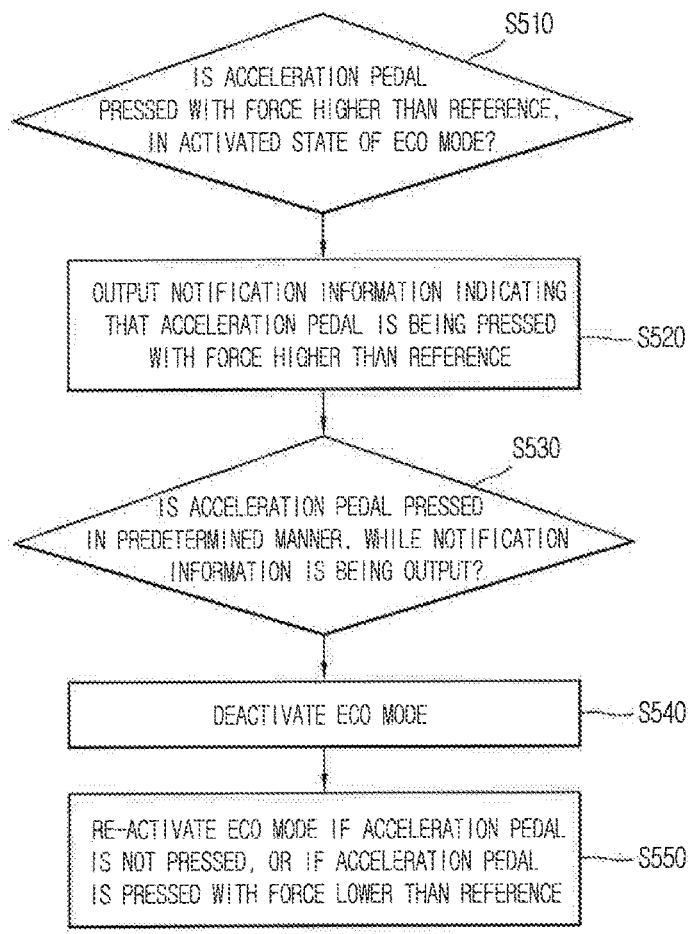
FIG. 12 is a flowchart illustrating an example of turning on/off a fuel-conservation mode of a vehicle according to a pressurization technique of an accelerator pedal.

FIG. 12 is a flowchart for explaining a control method to turn on/off an eco mode a pressurization manner of the accelerator pedal.

Firstly, the controller determines whether the accelerator pedal is pressed with a force higher than a reference, in an activated state of an eco mode (S510). If it is determined that the accelerator pedal is pressed with a force higher than the reference, the controller outputs, to the display, notification information indicating that the accelerator pedal is being pressed with the force higher than the reference (S520).

Then, the controller determines whether the accelerator pedal is pressed in a predetermined manner while the notification information is being output (S530). If it is determined that the accelerator pedal is pressed in the predetermined manner, the controller deactivates the eco mode (S540).

The predetermined manner in which the accelerator pedal is pressed may correspond to a driver's intention to deactivate the eco mode, which may be a manner of pressing the accelerator pedal with a force greater than a force in case of outputting the notification information. However, the present disclosure is not limited to this. The predetermined manner may correspond to various scenarios, for example a scenario in which the accelerator pedal is consecutively pressed two times, or other operations of the accelerator pedal that may indicate a driver's intention to deactivate the eco mode.

Next, the controller re-activates the eco mode, if the accelerator is not pressed or if the accelerator pedal is pressed with a force lower than the reference, after the eco mode is deactivated as the accelerator pedal is pressed in the predetermined manner (S550).

Figure 13:
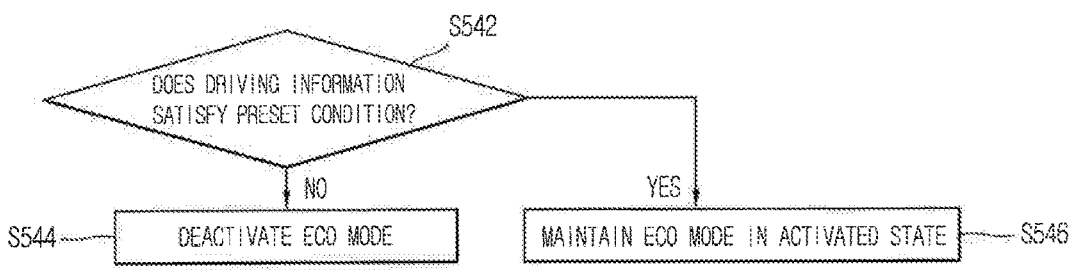
FIG. 13 is a flowchart illustrating an example of the control technique of FIG. 12 in more detail.

Referring to FIG. 13, the controller may firstly determine whether driving information satisfies a predetermined condition, before deactivating the eco mode (S542).

More specifically, the controller acquires driving information using a vehicle sensor, and determines whether there is any problem in accelerating the vehicle. For instance, acceleration should be limited when there is an object having a possibility of collision (e.g., vehicle/pedestrian/obstacle, etc.) on a moving path of the vehicle, when a speed limit on a driving road is equal to or lower than a driving speed, or when a driving road is a children protection zone.

If driving information satisfies a predetermined condition to restrict acceleration of the vehicle, the controller maintains the eco mode (S546). For example, if driving information satisfies a predetermined condition even if the accelerator pedal is pressed in the predetermined manner while the notification information is being output, the controller maintains the eco mode.

The driving information satisfies the predetermined condition, in a case where a speed limit of a driving road is exceeded as acceleration is executed to a level corresponding to a pressurization degree of the accelerator pedal, or in a case where a driving road is a children protection zone.

On the contrary, if the driving information does not satisfy the predetermined condition, the controller deactivates the eco mode (S544).

Figure 14:
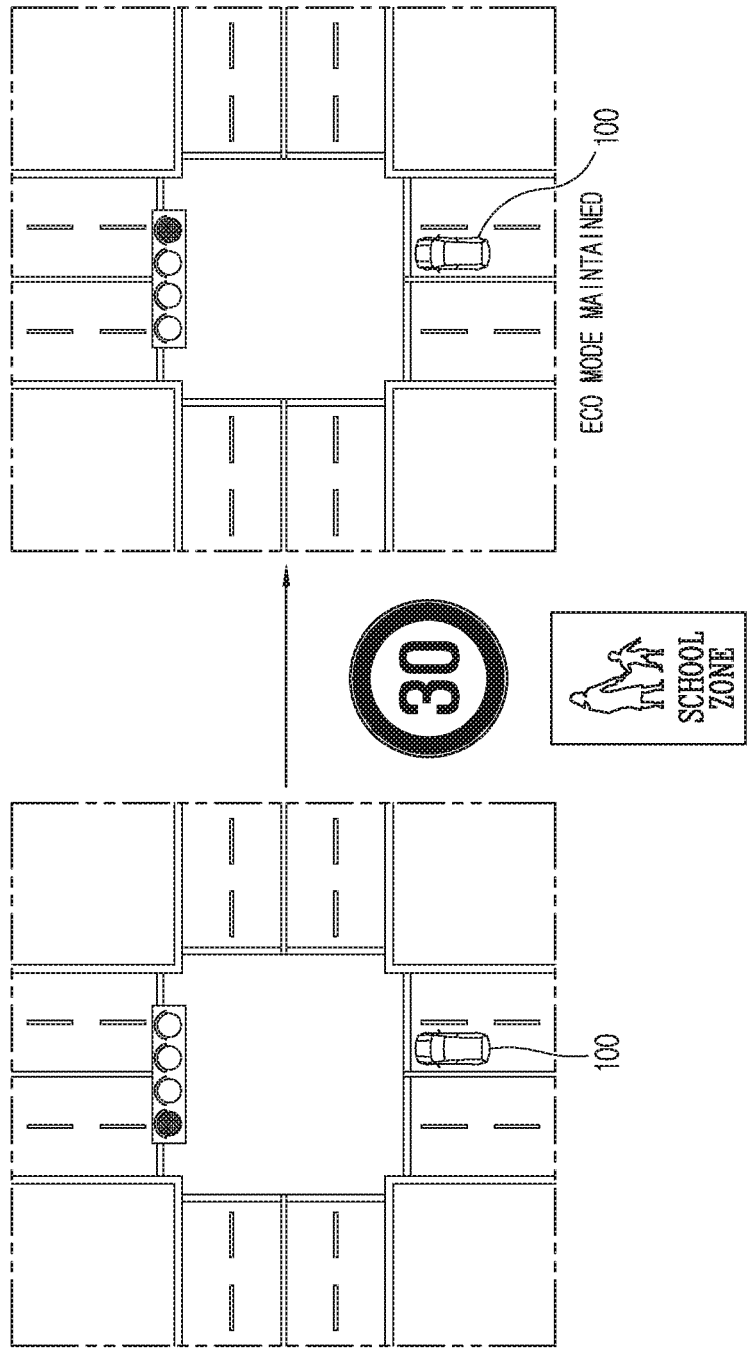
FIG. 14 is a diagram illustrating an example of the control technique shown in FIG. 13.

For instance, if the accelerator pedal is pressed with a force higher than the reference in a state where the vehicle is stopped at a crossroad, then it may be determined that a driver wishes to accelerate the vehicle. Thus, the eco mode should be temporarily released. However, if a driving road is a children protection zone as shown in FIG. 14, the eco mode may be maintained even if the accelerator pedal is pressed in the predetermined manner, and this may correspond to a scenario in which rapid acceleration is dangerous.

Various implementations may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A vehicle control device, comprising:
 a sensor configured to sense driving information of a vehicle; and
 a controller configured to:
 activate or deactivate a fuel conservation mode of the vehicle based on a user input;
 restrict acceleration of an engine of the vehicle to be within a predetermined range based on an accelerator pedal of the vehicle being pressed with a force that is greater than a threshold force and based on the vehicle being in an activated state of the fuel conservation mode; and based on driving information satisfying a first condition, release a restriction on the acceleration of the engine of the vehicle in the activated state of the fuel-conservation mode, wherein the controller is further configured to, based on the driving information having satisfied the first condition, subsequently restrict the acceleration of the engine based on the driving information not satisfying the preset condition in a state in which the accelerator pedal is pressed with the force greater than the threshold force in the activated state of the fuel conservation mode.

2. The vehicle control device of claim 1, wherein the controller is configured to activate or deactivate the fuel conservation mode based on the driving information, regardless of the user input.

3. The vehicle control device of claim 2, wherein a display is disposed in the vehicle, and
the controller is further configured to:
control the display to output a graphic object indicating the activated state of the fuel conservation mode in a state in which the fuel conservation mode is activated, and
control the graphic object to disappear from the display based on the fuel conservation mode being deactivated.

4. The vehicle control device of claim 3, wherein the controller is configured to deactivate the fuel conservation mode in a state in which the vehicle executes a lane change while the accelerator pedal is pressed with the force greater than the threshold force.

5. The vehicle control device of claim 4, wherein the controller is further configured to, in the state in which the vehicle executes the lane change while the accelerator pedal is pressed with the force greater than the threshold force, deactivate the fuel conservation mode based on a second vehicle being detected at a rear side of a new lane for the lane change within a predetermined distance, and based on a speed of the second vehicle being greater than a speed of the vehicle.

6. The vehicle control device of claim 4, wherein the controller is further configured to:
deactivate the fuel conservation mode based on the vehicle executing the lane change from a first lane to a second lane while the accelerator pedal is pressed with the force greater than the threshold force; and
activate the fuel conservation mode based on the vehicle executing a second lane change from the second lane to the first lane.

7. The vehicle control device of claim 3, wherein the controller is further configured to deactivate the fuel conservation mode based on the accelerator pedal being pressed with the force greater than the threshold force in a state in which an inclination of an uphill portion of a road on which the vehicle is travelling is greater than a threshold inclination.

8. The vehicle control device of claim 3, wherein the controller is further configured to deactivate the fuel conservation mode based on the accelerator pedal being pressed with the force greater than the threshold force based on a traffic light being detected within a predetermined distance in a driving direction of the vehicle, and the traffic light outputting at least one of a stop signal, a warning signal, or a proceed signal.

9. The vehicle control device of claim 3, wherein the controller is further configured to deactivate the fuel conservation mode based on the accelerator pedal being pressed with the force greater than the threshold force in a stopped state of the vehicle.

10. The vehicle control device of claim 9, wherein the controller is further configured to activate the fuel conservation mode based on a second vehicle being sensed at a front side in a driving direction of the vehicle in a state in which the accelerator pedal is pressed with the force greater than the threshold force.

11. The vehicle control device of claim 9, wherein the controller is further configured to:
deactivate the fuel conservation mode based on a second vehicle being sensed at a rear side in a driving direction of the vehicle in a state in which the accelerator pedal is pressed with the force greater than the threshold force in a stopped state of the vehicle; and
maintain the fuel conservation mode based on the second vehicle not being sensed at the rear side in the driving direction of the vehicle.

12. The vehicle control device of claim 3, wherein the driving information satisfying the first condition corresponds to a scenario in which an object is detected having a likelihood of colliding with the vehicle in a driving direction of the vehicle, and the vehicle executing a steering operation to evade the detected object.

13. The vehicle control device of claim 1, wherein the sensor is configured to sense a weight of a load inside the vehicle, and
wherein the controller is configured to change the threshold force based on the weight of the load inside the vehicle.

14. The vehicle control device of claim 13, wherein the controller is configured to:
set the threshold force to a first threshold force based on the weight of the load inside the vehicle being smaller than a threshold weight; and
set the threshold force to a second threshold force greater than the first threshold force based on the weight of the load inside the vehicle being equal to or greater than the threshold weight.

15. A vehicle control device, comprising:
a display disposed in a vehicle; and
a controller configured to:
control the display to output a graphic object indicating an activated state of a fuel conservation mode of the vehicle, based on the fuel conservation mode being activated and restricting acceleration of an engine of the vehicle;
control the display to output notification information indicating that an accelerator pedal of the vehicle is being pressed with a force greater than a threshold force, based on the accelerator pedal being pressed with the force greater than the threshold force in an activated state of the fuel conservation mode; and
deactivate the fuel conservation mode based on the accelerator pedal being pressed in a predetermined manner while the notification information is being output.

16. The vehicle control device of claim 15, wherein the predetermined manner in which the accelerator pedal is pressed corresponds to the accelerator pedal being pressed with a force greater than a force with which the accelerator pedal is pressed in the case of outputting the notification information.

17. The vehicle control device of claim 16, further comprising a sensor configured to sense driving information of the vehicle, wherein the controller is configured to maintain the fuel conservation mode based on the driving information satisfying a first condition, even if the accelerator pedal is pressed in the predetermined manner while the notification information is being output.

18. The vehicle control device of claim 17, wherein the driving information satisfying the predetermined condition corresponds to the vehicle exceeding a speed limit of a road on which the vehicle is travelling as the acceleration of the vehicle reaches a level corresponding to a pressurization degree of the accelerator pedal.

19. The vehicle control device of claim 16, wherein the controller is further configured to, subsequent to the fuel conservation mode being deactivated as the accelerator pedal is pressed in the predetermined manner, re-activate the fuel conservation mode based on the accelerator not being pressed or based on the accelerator pedal being pressed with a force that is less than the threshold force.

* * * * *